United States Patent [19]

Mohrlang

[11] Patent Number: 4,707,140
[45] Date of Patent: Nov. 17, 1987

[54] FEED MIXER

[75] Inventor: Harry Mohrlang, Brush, Colo.

[73] Assignee: Mohrlang Manufacturing, Inc., Brush, Colo.

[21] Appl. No.: 912,924

[22] Filed: Sep. 29, 1986

[51] Int. Cl.⁴ .......................... B01F 7/04; B01F 15/02
[52] U.S. Cl. .................................... 366/186; 366/196; 366/300; 366/311; 366/603
[58] Field of Search ............. 366/184, 186, 297, 300, 366/603, 309–313, 325, 299, 301, 83, 84, 85, 97, 66, 67, 194–196

[56] References Cited

U.S. PATENT DOCUMENTS

| | | | |
|---|---|---|---|
| 811,145 | 1/1906 | Higgins | 366/312 |
| 1,366,777 | 1/1921 | Flowers | 366/311 |
| 1,685,189 | 9/1928 | Cover | 366/311 |
| 1,765,315 | 6/1930 | Thompson | 366/311 |
| 2,809,021 | 10/1957 | Laden et al. | 259/107 |
| 3,672,640 | 6/1972 | Crose | 259/6 |
| 3,854,627 | 12/1974 | Coons | 366/186 |
| 3,958,968 | 5/1976 | Hosaka | 366/312 |
| 4,448,536 | 5/1984 | Strong | 366/300 |
| 4,506,990 | 3/1985 | Neier et al. | 366/299 |

*Primary Examiner*—Robert W. Jenkins
*Attorney, Agent, or Firm*—W. Scott Carson

[57] ABSTRACT

A feed mixer for cattle and other livestock. The mixer includes a mixing tank with two main chambers on either side of an auxiliary chamber. Rotors in the general shape of paddle wheels are mounted in each main chamber. The mixing paddles of each rotor are elongated and extend between corresponding sections of the rotor with the axis of each paddle offset from the rotational axis of the rotor by about 15 degrees. In this manner, the mixing paddles give a slight axial component of movement to the feed as it is being mixed. The paddles of each rotor are preferably operated out of phase with those of the other rotor wherein portions of the feed are alternately transferred across from one main chamber to the other. This transferring effect combined with the axial component of movement imparted in each main chamber by the mixing paddles results in a unique mixing pattern wherein feed is moved between and along the main chambers substantially in a spiral 8 path. Also, each mixing paddle is pivotally mounted and biased by the feed to provide a wiping effect on the chamber walls while also allowing for easy movement and passage of the paddle over any obstacles (e.g., hay balls, rocks) it may encounter in the feed.

30 Claims, 14 Drawing Figures

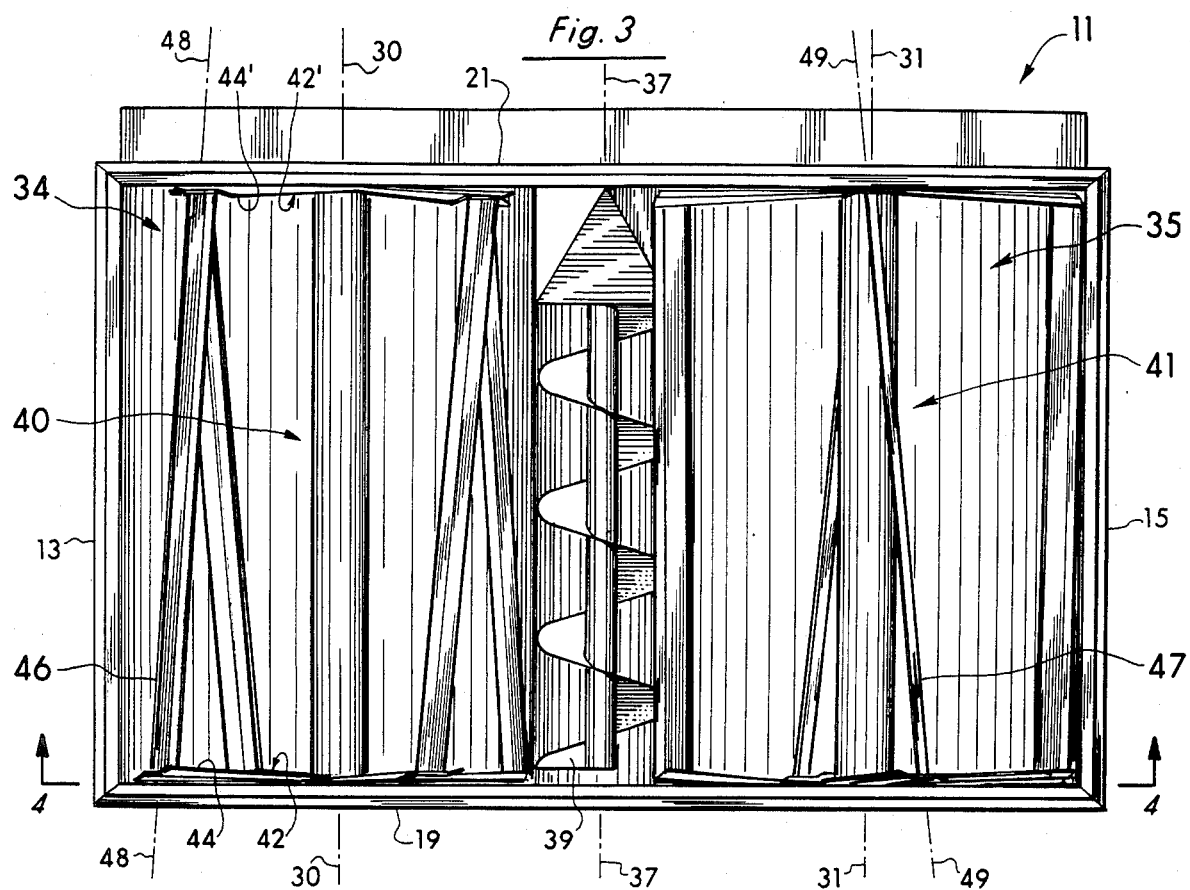
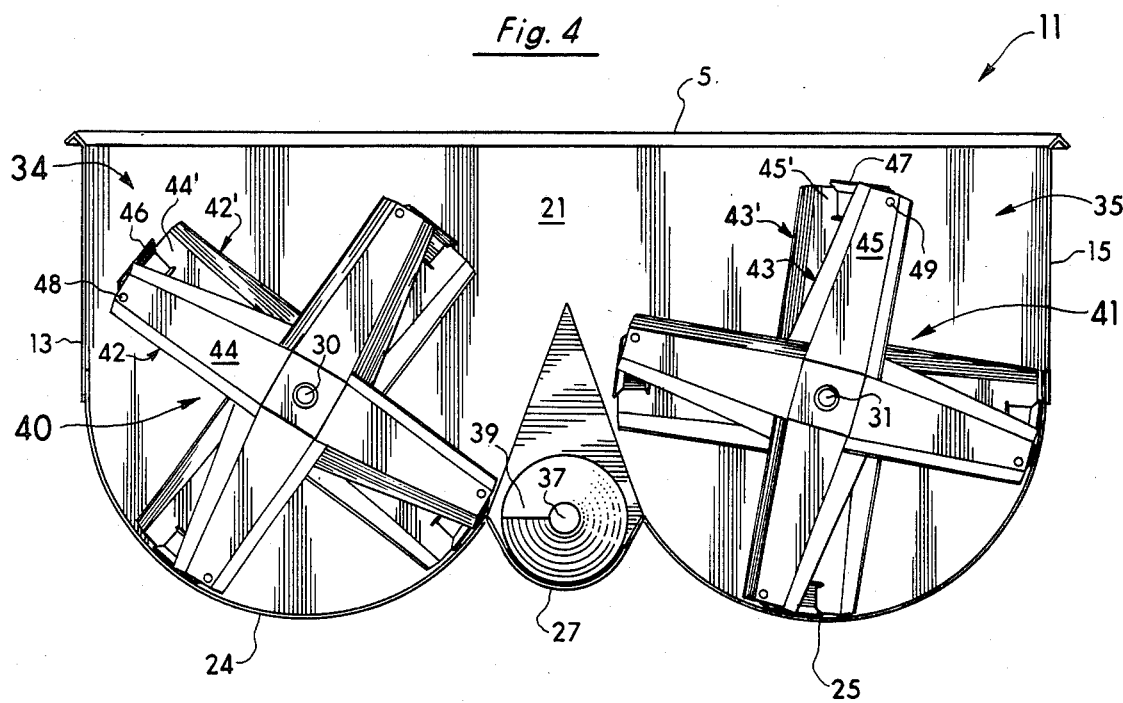

FEED MIXER

BACKGROUND OF THE INVENTION

1. Field of the Invention

This invention relates to the field of mixers and more particularly to the field of portable feed mixers for cattle and other livestock.

2. Background Discussion

Feed lots are widely used to prepare cattle and other livestock for market. In operating such lots, the cattle are commonly kept in small groups in separated pens depending upon a number of factors including arrival time, size, breed, and intended market. While in the pens, the cattle are fed at controlled intervals once or more a day and their health and progress closely monitored. As an important part of the operation of the lot, the components (e.g., grain, fat, hay, barley) of the feed are also closely monitored and varied to prepare the cattle for market in the most efficient and effective manner. In doing so, the operator relies upon a number of considerations including the scheduled departure time, desired end weight, progress of the cattle toward the desired weight, and availability and price of various feed components.

Portable feed mixers are almost universally used in such feed lots to mix and deliver the feed to each pen. In operation, the portable mixer is typically moved from one location to another with different feed components being added at each location by chutes, front loaders, and the like. The mixer then mixes the feed components as it is being loaded and as it travels to the feed lot. At the feed lot, the mixed feed is then delivered in measured amounts into feed troughs immediately adjacent the cattle pens.

Although numerous methods and apparatus are used to mix the feed, they all strive toward a common goal of being able to quickly and thoroughly mix a wide variety of feed components. Efficient operation is particularly important in the environment of a feed lot where the mixer may be required to mix and deliver on a daily basis upwards of, for example, ten different feed mixes to fifty different pens in the feed lot. Thorough mixing is also important in this environment as each load of the mix is delivered along a trough with each of the animals either eating at one spot or over a period of time returning to the trough at different spots. In this light, if the feed is not uniformly mixed, an animal may receive too much or too little of a particular feed component. With this in mind, the present invention was developed. With the present invention, axially offset, mixing paddles are pivotally mounted between rotor sections and operated in a unique way to achieve a thorough and uniform mixing of a wide range of feed components in a quick and efficient manner.

SUMMARY OF THE INVENTION

This invention involves a feed mixer primarily for cattle and other livestock. The mixer includes a mixing tank having two main chambers on either side of an auxiliary chamber. Each main chamber has a rotor mounted in it for rotation about a horizontal axis and includes two rotor sections with radially extending arms. Mounted between corresponding arms of each rotor section are elongated, mixing paddles wherein each rotor assumes an overall configuration resembling a paddle wheel. The corresponding rotor arms in each rotor section are preferably offset from one another by about 15 degrees with the elongated, mixing paddles extending therebetween and being offset from the rotational axis of the rotor by about the same amount. In this manner, the mixing paddles give a slight axial component of movement to the feed as it is being mixed. Additionally, the mixing paddles in each of the main chambers move the feed across the bottom of the chamber toward the auxiliary chamber and toward each other. In this regard, the radially extending arms of each rotor are preferably operated out of phase with those of the other rotor wherein portions of the feed are alternately transferred across from one main chamber to the other. This transferring effect combined with the axial component of movement imparted in each main chamber by the mixing paddles results in a unique mixing pattern wherein feed is moved between and along the main chambers substantially in a spiral 8 path. Also, each mixing paddle is pivotally mounted and biased by the feed to provide a wiping effect on the chamber walls while also allowing for easy movement and passage of the paddle over any obstacles (e.g., hay balls, rocks) it may encounter in the feed.

BRIEF DESCRIPTION OF THE FIGURES

FIG. 3 is a top view taken along line 3—3 of FIG. 1 illustrating the positioning of the rotors in the main mixing chambers and the central, discharge auger.

FIG. 4 is a view taken along line 4—4 of FIG. 3 further illustrating the arrangement of the rotors and the central auger.

DETAILED DESCRIPTIOIN OF THE PREFERRED EMBODIMENTS

Figure 1:
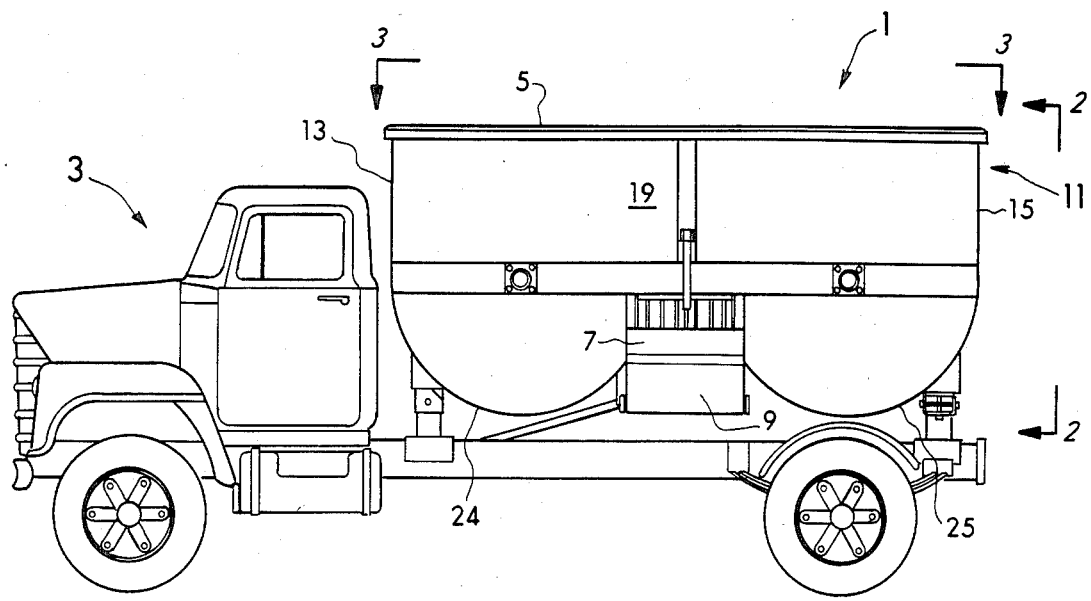
FIG. 1 is a side view of the truck mounted mixer of the present invention.
Figure 2:
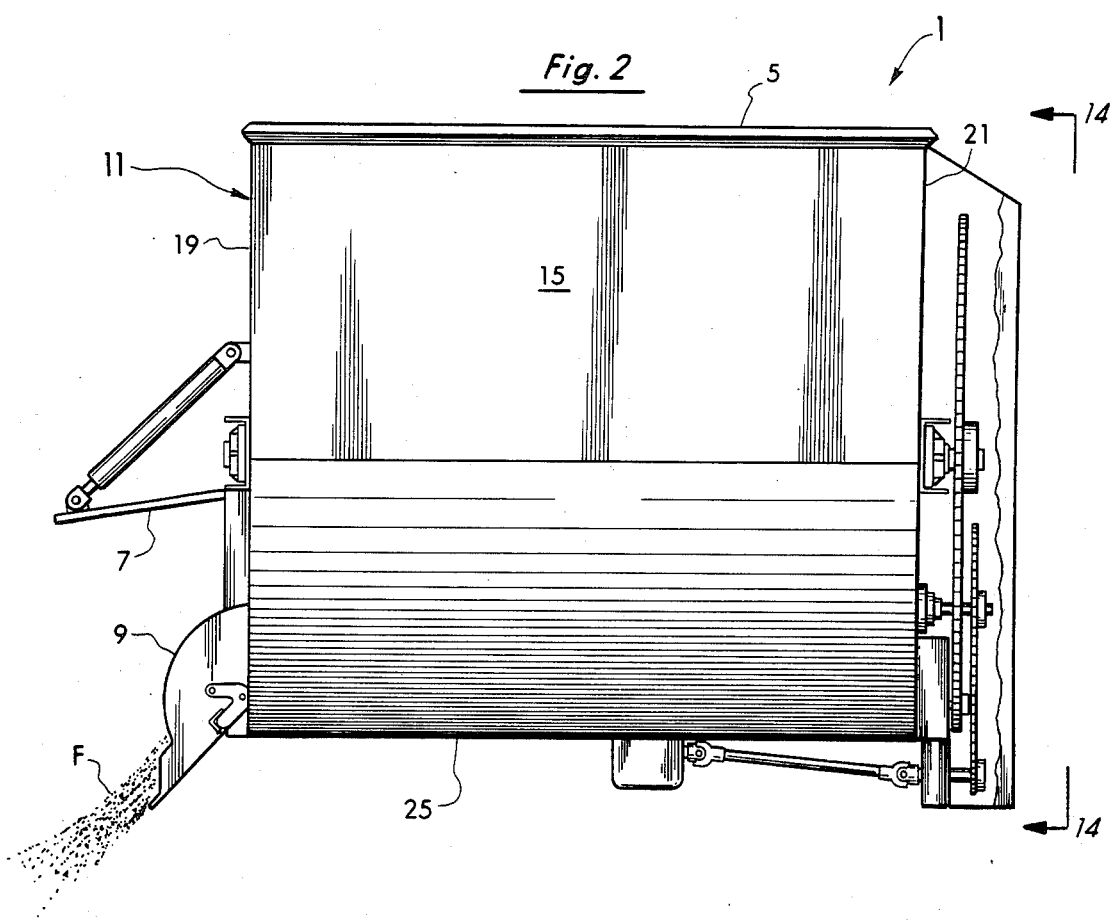
FIG. 2 is a rear view taken along line 2—2 of FIG. 1 showing the discharge gate and chute in their open positions and partially showing the drive arrangement for the mixer.
Figure 5:
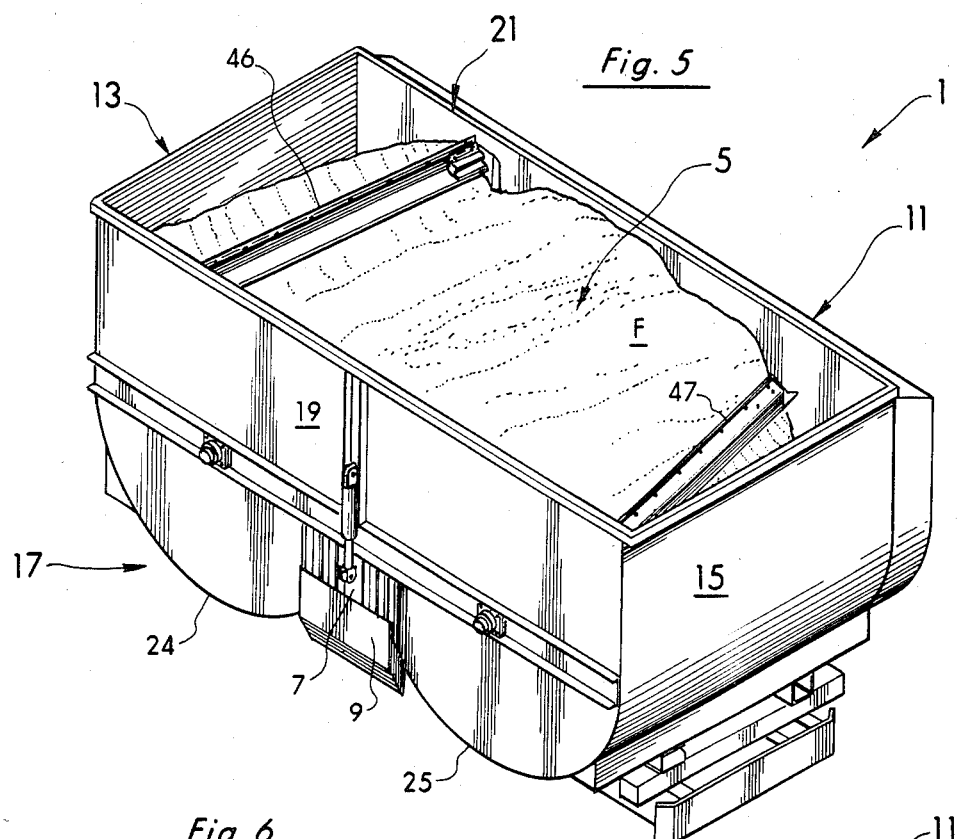
FIG. 5 is a perspective view of the mixer.

As best illustrated in FIG. 1, the portable feed mixer 1 of the present invention is preferably mounted on a truck base 3 and is primarily intended for use in feed lots where compactness and mobility are essential. In general operation as shown in FIGS. 2 and 5, the feed components (e.g., grain, fat, hay, and barley) are loaded into the mixer 1 through the open top 5 (see FIG. 5) and once mixed, the feed F is then discharged out of the mixer with the gate 7 raised (see FIG. 2) and the chute 9 lowered.

The mixer 1 includes the mixing tank 11 (FIG. 5) which has forward and rearward walls 13 and 15, bottom wall 17, and opposite side walls 19 and 21. The bottom wall 17 has first and second curved wall portions 24 and 25 with a relatively small, curved wall portion 27 (see FIG. 6) therebetween. The relatively large, curved wall portions 24 and 25 extend along substantially horizontal axis 30 and 31 and respectively define the bottoms of first and second mixing chambers 34 and 35. The relatively small wall portion 27 therebetween also extends along a substantially horizontal axis 37 parallel to the axes 30 and 31 and defines an auxiliary chamber which has an auger 39 mounted in it.

In each of the main mixing chamber 34 and 35 (see FIGS. 3, 4 and 6) is mounted a respective rotor 40 and 41. Referring initially to rotor 40 in FIGS. 3 and 4, it has first and second rotor sections 42 and 42' spaced from each other along the rotational axis 30. The rotor sections 42 and 42' are respectively positioned adjacent the side walls 19 and 21 (see FIG. 3) and have a plurality of radially extending arms 44 and 44' (FIG. 4). Supported between corresponding sets of arms 44 and 44' are elongated, mixing paddles 46 wherein the rotor 40 assumes an overall shape resembling a paddle wheel. Each mixing paddle 46 is mounted between the corresponding arms 44 and 44' for pivotal movement about an axis 48 and as illustrated in FIG. 4, each of the corresponding arms 44 and 44' in a set is offset from the other about the rotational axis 30 by about 15 degrees. In this manner as best seen in FIG. 3, the mixing paddles 46 are then mounted to extend substantially between the side walls 19 and 21 at an angle of about 15 degrees to the rotational axis 30. In the preferred embodiment, the paddles 46 extend substantially straight along the axis 48 wherein the axes 48 and 30 are then also offset about 15 degrees relative to each other. The second rotor 41 is essentially a mirror image of rotor 40 and has corresponding rotor sections 43 and 43' (see FIG. 4), arms 45 and 45', and paddles 47 pivotally mounted for movement about axes 49.

Figure 6:
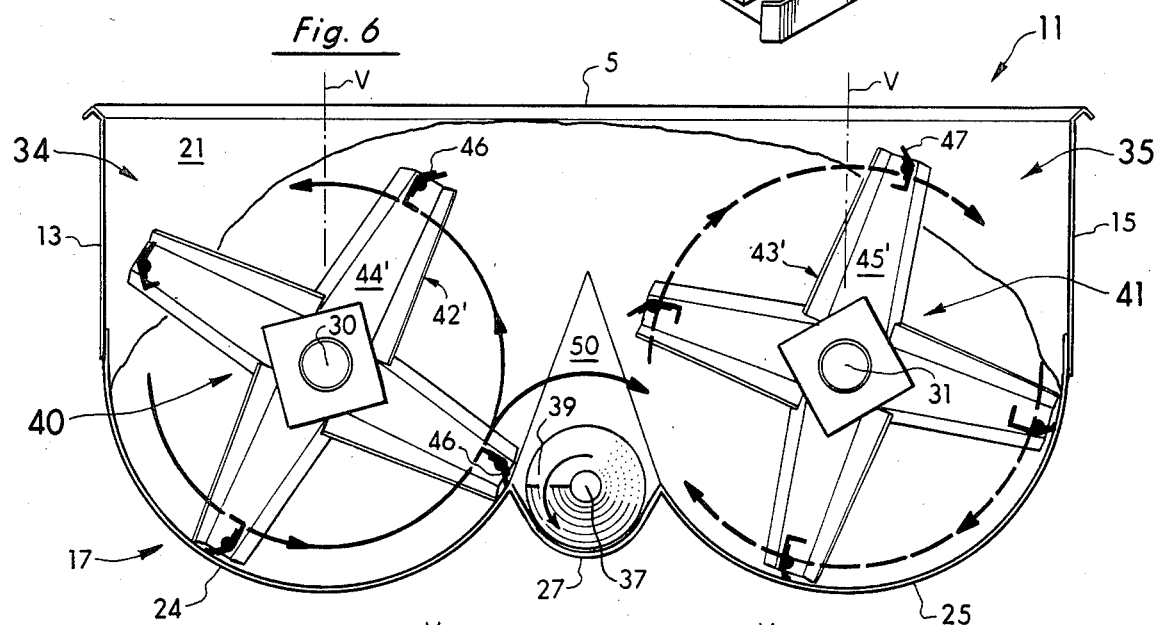
FIG. 6 is a view of the rotors in operation illustrating the general path of travel of the feed about each rotor and the transfer of material from one mixing chamber to the other.

In operation as shown in FIG. 6, the first and second rotors 40 and 41 are rotated in opposite directions. In this manner, the mixing paddles 46 and 47 adjacent the outer peripheries of the rotors 40 and 41 move the feed across the bottom wall portions 24 and 25 of the respective chambers 34 and 35 toward the auxiliary chamber at 27 and toward each other. In doing so, the mixing paddles 46 and 47 of each rotor 40 and 41 travel in an arc substantially conforming to and adjacent the respective first and second wall portions 24 and 25. As stated above, the mixing paddles 46 of the first rotor 40 and the mixing paddles 47 of the second rotor 41 are each supported at a slight acute angle (e.g., 15°) to the respective rotational axes 30 and 31. In this manner, the paddles 46 and 47 impart an axial component of movement to the feed along the respective axes 30 and 31. In the preferred embodiment, the axial component of movement supplied by the paddles 46 and 47 is in the same relative direction along the axes 30 and 31 (e.g., toward the side wall 21) and is in a direction opposite to the feed being moved along the axis 37 in the auxiliary chamber by the auger 39. Auger 39 is operated with rotors 40 and 41 both for mixing when the gate 7 and chute 9 are closed and for mixing and discharge when the gate 7 and chute 9 are open (FIG. 2).

Figure 7:
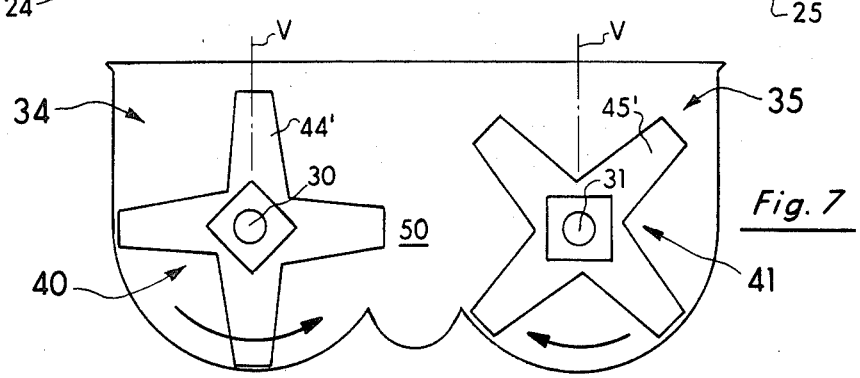
FIG. 7 is a view similar to FIG. 6 illustrating the manner in which the rotors are operated 45 degrees out of phase with each other.

As shown in FIGS. 6 and 7, the radially extending arms 44 and 44' of the first rotor 40 and the corresponding arms 45 and 45' of the second rotor 41 are preferably operated out of phase with each other wherein portions of the feed are alternately transferred across from one main chamber to the other. That is, the rotors 40 and 41 are preferably operated in a staggered fashion (see FIG. 7) so that the mixing paddles 46 and 47 are out of phase with each other (e.g., 45°) and alternately pass by a common location 50 in the mixing tank 11 substantially midway between the first and second axes 30 and 31. In this manner, part of the feed in the first main chamber 34 is transferred across to the second main chamber 35 at 50 in FIG. 6 as each mixing paddle 46 of the first rotor 40 passes by the common location 50. In a similar and alternating manner, part of the feed in the second main chamber 35 is then transferred across to be mixed in the first main chamber 34 substantially at the common location 50 as each mixing paddle 47 of the second rotor 41 passes by the common location 50. In the preferred embodiment, each rotor section 42, 42', 43 and 43' has four arms at 90 degrees to each other and the rotors 40 and 41 are operated 45 degrees out of phase. For example and referring to FIG. 6, the top arm 45' is shown in a position 15 degrees to the right of vertical V and the top arm 44' is shown to be 30 degrees to the right of vertical V. To move arm 44' counterclockwise 30 degrees to a vertical position as shown in FIG. 7 will then correspondingly move the arm 45' clockwise 30 degrees to the position of FIG. 7. With arm 44' of rotor 40 vertical, the arm 45' of rotor 41 is then 15 plus 30 or 45 degrees from the vertical. If there are fewer or more than the preferred four arms (e.g., n arms), they are preferably spaced 360/n about the rotational axis of the rotor and the paddles of one rotor staggered 360/2n from the paddles of the other rotor.

Figure 8:
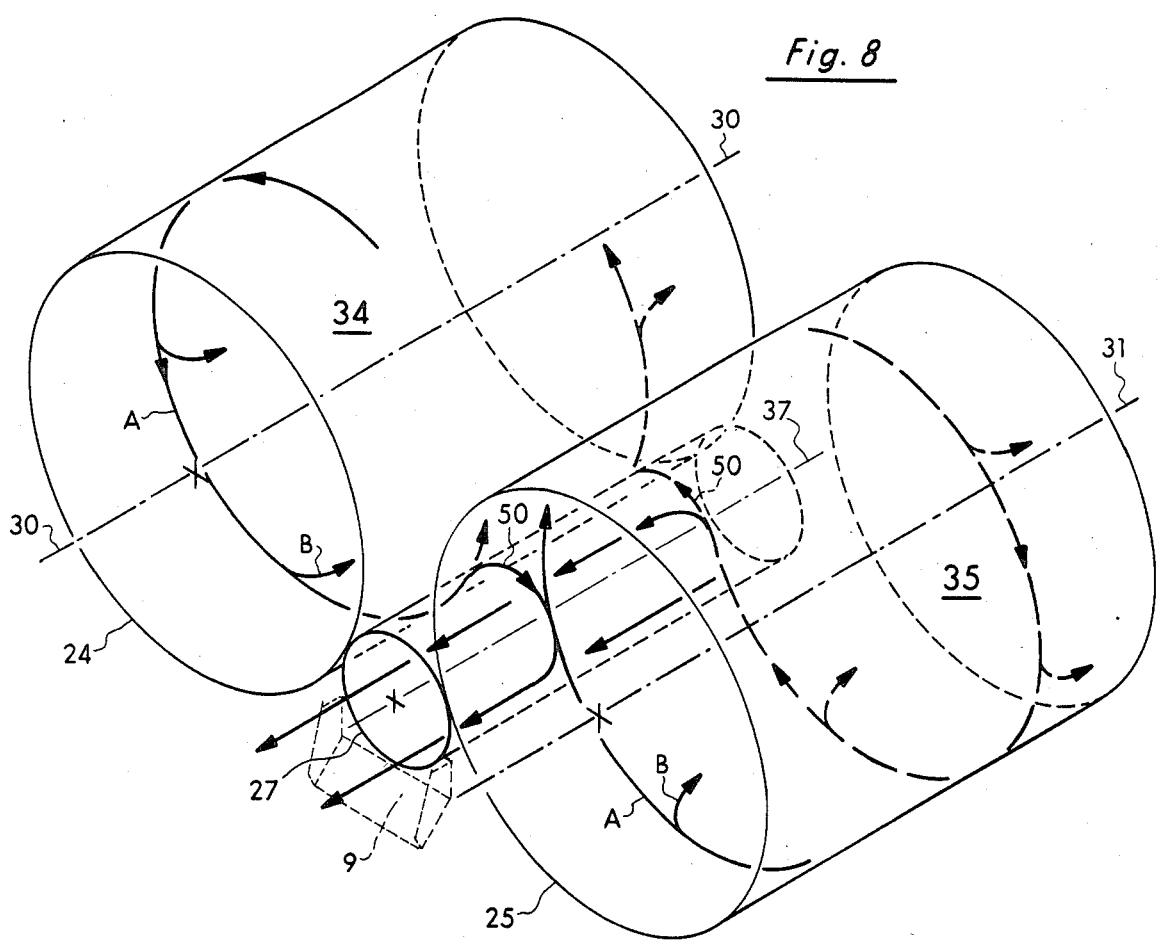
FIG. 8 is a schematic diagram of the travel of the feed and paddles in the mixer.
Figure 9:
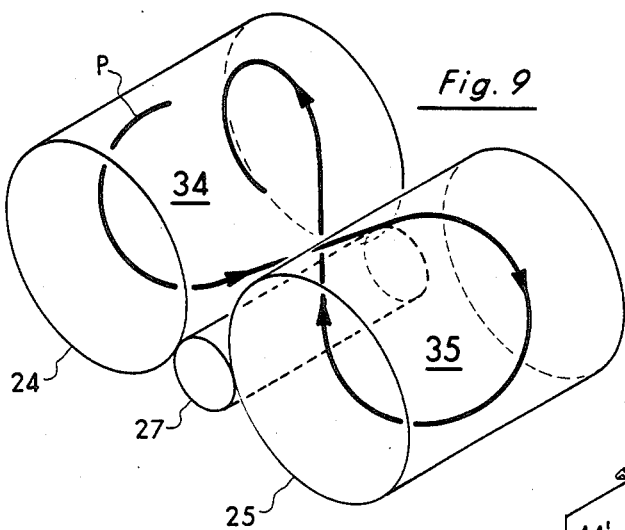
FIG. 9 is a schematic diagram of the spiral 8 path traveled by portions of the feed in the mixer.
Figure 10:
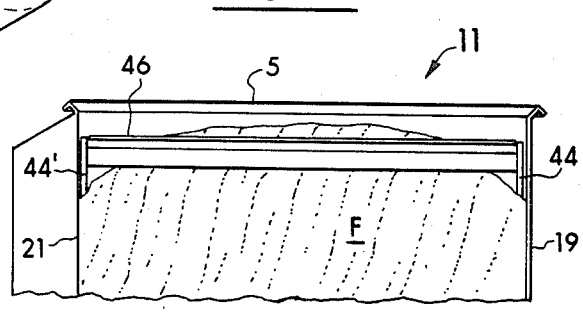
FIG. 10 is a view taken along line 10—10 of FIG. 11 illustrating the manner in which portions of the feed tumble or spill down the top surface of the feed pile at a slight acute angle to the forward and rearward walls.
Figure 11:
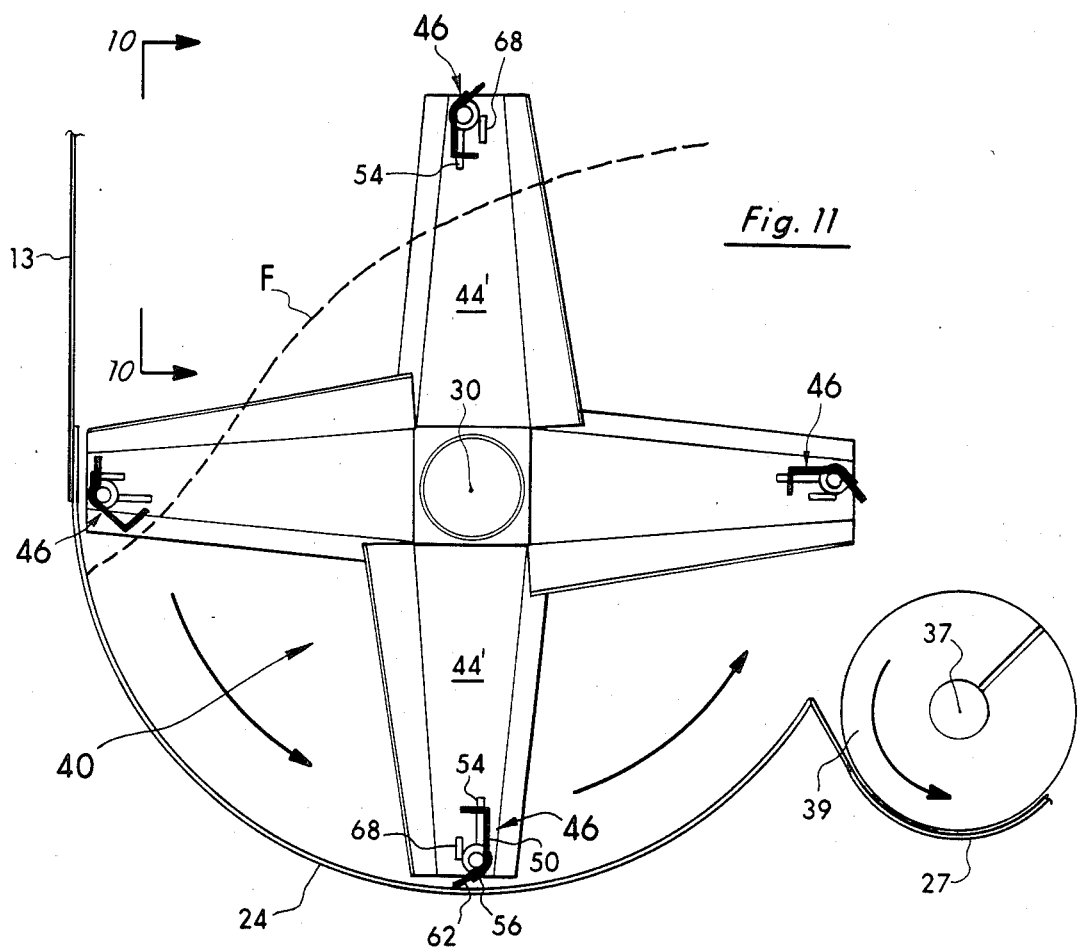
FIG. 11 is an enlarged view of one of the rotors and its mixing paddles.

Additionally, as illustrated in FIG. 9, the axial component of movement toward the side wall 21 provided to the feed by the paddles 46 and 47 combines with the transferring effect just described wherein portions of the feed move between and along the first and second mixing chambers 34 and 35 in a substantially spiral 8 path P. In the preferred embodiment, the 8 is actually on its side. This general movement of the feed is also depicted in FIG. 8 with a transfer at 50 from chamber 34 to 35 shown in solid lines in the front and an alternate and out of phase transfer from chamber 35 to 34 at 50 shown in dotted lines in the rear. FIG. 8 also illustrates the arcuate movement of the paddles 46 and 47 at A and the slight axial movement at B that the paddles 46 and 47 impart to the feed. Further, as best illustrated in FIGS. 10 and 11, the mixing paddles 46 preferably pass through and out of the feed F near the top of the swing of the rotor 40 (see FIG. 11). This movement combined with the movement of the paddles 46 back into the feed pile F adjacent the forward wall 13 impart an axial component of movement to the feed wherein the feed then tumbles or spills down the top surface of the feed pile at a slight acute angle (e.g., 15°) toward the forward wall 13 as illustrated in FIG. 10. Mixing paddles 47 of rotor 41 operate in a similar manner so that feed F also tumbles or spills down in chamber 35 toward the rearward wall 15 as partially illustrated in FIG. 5. In this manner, a number of techniques are in operation alone and together to provide a very thorough mixing of the feed in a quick and efficient manner.

Figure 12:
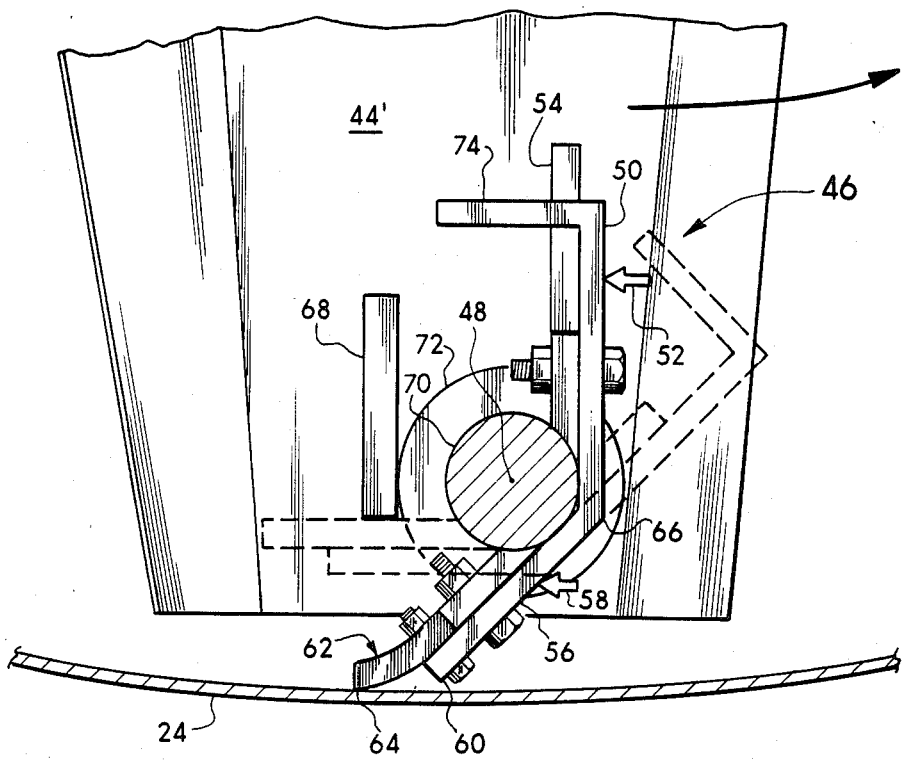
FIG. 12 is an enlarged view of one of the mixing paddles illustrating the detailed structure thereof.
Figure 13:
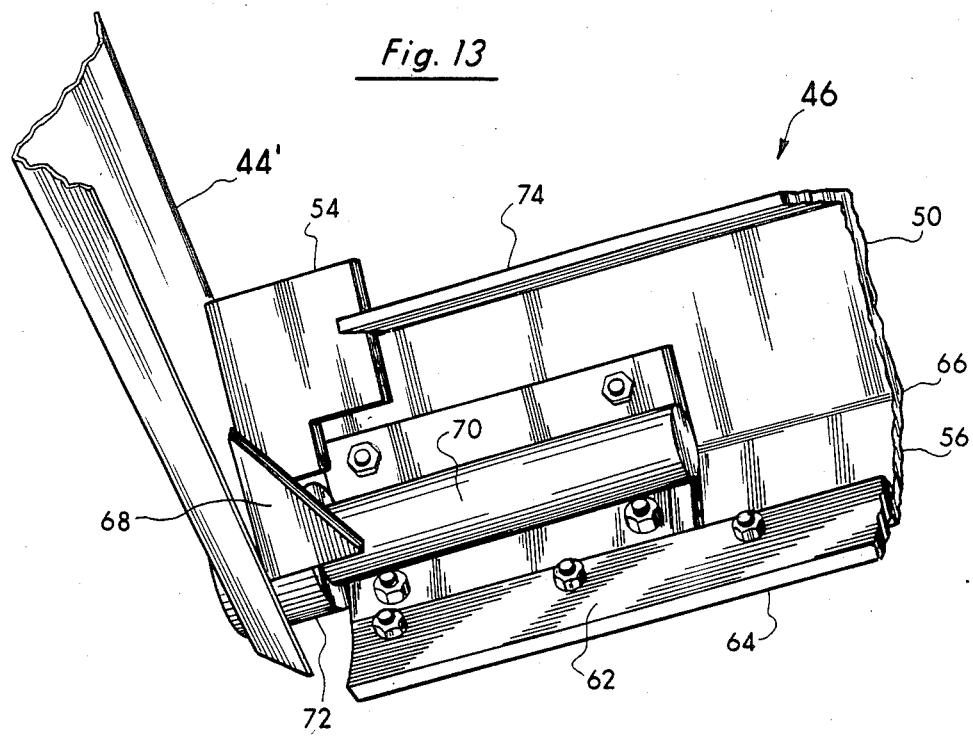
FIG. 13 is a perspective view taken from the left of FIG. 12 illustrating further details of the mixing paddles and the manner in which the paddles are pivotally mounted to the rotor arms.

The mixing paddles such as 46 as shown in FIGS. 11-13 are pivotally mounted for movement about the axis 48 between a first position (shown in solid lines of FIG. 12) and a second position (shown in dotted lines in FIG. 12). The solid line position in FIG. 12 shows the normal working position of the paddle 46 as it passes through the feed. The dotted line position shows a by-pass position it can assume if the paddle 46 encounters an obstacle (e.g., hay ball, rock) in the feed. As shown in FIG. 12, the paddle 46 has a first, substantially planar face 50 extending outwardly of the pivotal axis 48. When feed strikes the face 50 as the paddle 46 moves through the feed, it produces a first torque 52 on the face 50 tending to pivot the paddle 46 in a counterclockwise direction about the axis 48. The torque represented by arrow 52 pivots the paddle 46 until it strikes the stop 54 (see FIG. 13) on the arm 44'. There is a corresponding stop 54 on the other arm 44 and in operation, the stops 54 hold the paddle 46 against the torque 52 of the feed with the face 50 in the solid line position of FIG. 12. In this position, the face 50 extends outwardly of the axis 48 away from the wall portion 24. The face 50 also extends between the offset arms 44 and 44' wherein the plane of the first face 50 is also offset from the axis 30 and imparts the slight axial component of movement to the feed along the axis 30 as the paddle 46 moves through the feed.

The paddle 46 also has a second face 56 (see FIG. 12) extending outwardly of the pivotal axis 48 in a direction substantially opposite to the first face 50. The second face 56 is angled relative to the first face 50 and dimensioned so that the torque 58 of the feed striking the face 56 as the paddle 46 moves through the feed is less than the torque 52. That is, the torque 58 tending to rotate the paddle 46 in a clockwise direction about the axis 48 is normally less than the torque 52 tending to rotate it in the opposite direction around the axis 48. Consequently, the paddle 46 is biased by the feed and normally assumes the solid line position of FIG. 12. In this normal position, the paddle 46 is biased against the stops 54 with the second face 56 biased toward the wall portion 24 and the outer edge 60 of the second face 56 positioned immediately adjacent the wall portion 24. In this position, the edge 60 which extends substantially parallel to the axis 48 will perform a scraping function. However, if desired and in the preferred embodiment, a flexible wiper 62 is attached to the paddle 46 and forms an extension of the second face 56 wherein the outer edge 64 of the wiper 62 actually abuts the wall portion 24 and wipes it clean.

Figure 14:
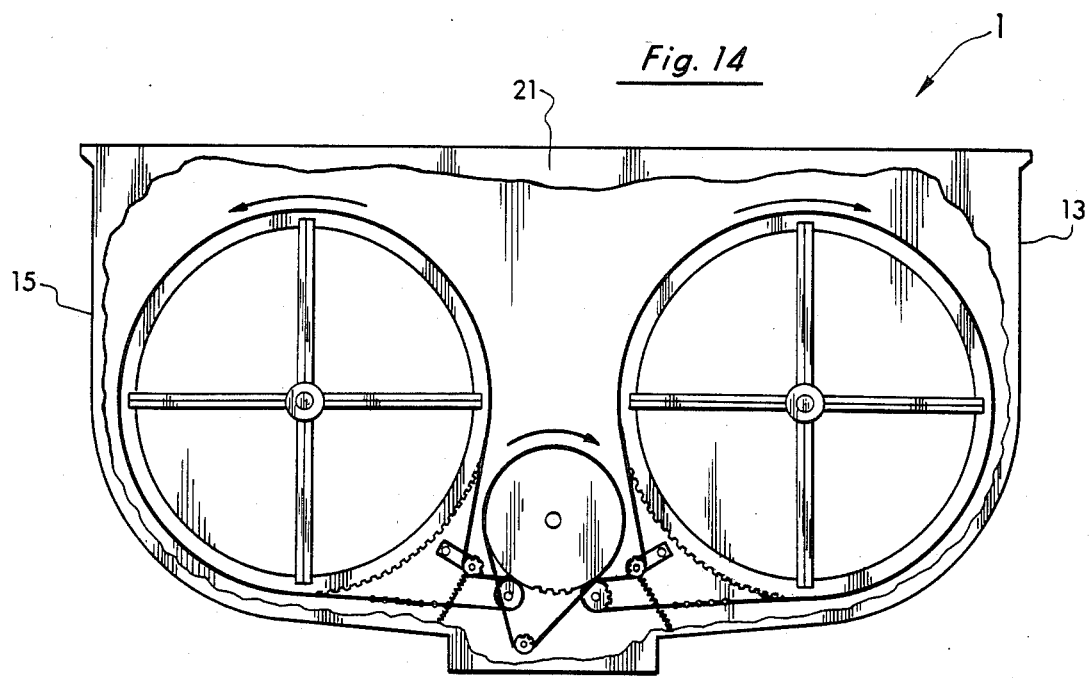
FIG. 14 is a view taken along line 14—14 of FIG. 1 illustrating a chain drive configuration for the mixer.

Referring again to FIG. 12, the first and second faces 50 and 56 intersect each other at 66 to form an edge which is substantially parallel to the axis 48. Further, the edge 66 is positioned ahead of the axis 48 relative to the direction of movement of the paddle 46 through the feed wherein the scraper portions at 60 and 64 trail or lag behind the axis 48. In operation as best seen in FIG. 12, the paddle 46 is normally biased by the feed in the solid line position. However, should the second face 56 encounter an obstacle such as a hay ball or rock in the feed which produces a torque on the second face 56 greater than the torque 52 on the first face, the paddle 46 will be pivoted to the dotted line position of FIG. 12 to pass over the obstacle. In the preferred embodiment, the pivoted paddle 46 will strike a second stop 68 to limit its movement as it passes over an obstacle so that the paddle 46 will promptly return under the force of the feed to its normal working position shown in solid lines in FIG. 12 once the obstacle has been passed over. A perspective view of the paddle 46, stops 54 and 68, bracket-pivot bar 70, and pivot assembly 72 is shown in FIG. 13. The member 74 in FIGS. 12 and 13 on the paddle 46 helps return the paddle 46 to its solid line position under the force of the feed striking it but its primary purpose is simply to add strength to the paddle 46. FIG. 14 as discussed above is a view along line 14—14 of FIG. 2 and shows a chain drive configuration for the mixer 1.

While several embodiments of the present invention have been shown and described in detail, it is to be understood that changes and modifications may be made to them without departing from the scope of the invention.

I claim:
1. A mixer primarily intended for use as a feed mixer for cattle and other livestock, said mixer including:
   a mixing tank having forward and rearward walls, a bottom wall, and opposite side walls, said bottom wall having a first relatively large curved wall portion extending along a first substantially horizontal axis and defining the bottom of a first chamber, a second relatively large curved wall portion extending along a second substantially horizontal axis and defining the bottom of a second main chamber, and a third relatively small curved wall portion along a third substantially horizontal axis and defining the bottom of an auxiliary chamber, said auxiliary chamber being positioned between said first and second main chambers with said first, second, and third axes substantially parallel to each other,
   a first rotor having a plurality of elongated mixing paddles adjacent the outer periphery thereof, each of said elongated mixing paddles extending substantially between said side walls wherein said first rotor substantially assumes a paddle wheel shape, and means for rotating said first rotor in said first main chamber about said first axis to move said mixing paddles across said first wall portion toward said auxiliary chamber, said first rotor having a diameter wherein said mixing paddles travel in an arc substantially conforming to and adjacent said first wall portion,
   a second rotor having a plurality of elongated mixing paddles adjacent the outer periphery thereof, each of said elongated mixing paddles extending substantially between said side walls wherein said second rotor substantially assumes a paddle wheel shape, and means for rotating said second rotor in said second main chamber about said second axis to move said mixing paddles across said second wall portion toward said auxiliary chamber, said second rotor having a diameter wherein said mixing paddles travel in an arc substantially conforming to and adjacent said second wall portion,
   said first rotor having first and second rotor sections spaced from each other along said first axis, means for supporting said elongated mixing paddles between said first and second rotor sections at a slight acute angle to said first axis wherein the mixing paddles of the rotating first rotor will impart an axial component of movement to the feed along said first axis, and means for pivotally mounting each of said elongated mixing paddles between said first and second rotor sections for pivotal movement about respective axes relative to said first and second rotor sections, and an auger and means for rotating said auger in said auxiliary chamber adjacent said third wall portion to move feed axially of said auger along said third axis.

2. A mixer primarily intended for use as a feed mixer for cattle and other livestock, said mixer including:

a mixing tank having forward and rearward walls, a bottom wall, and opposite side walls, said bottom wall having a first relatively large curved wall portion extending along a first substantially horizontal axis and defining the bottom of a first chamber, a second relatively large curved wall portion extending along a second substantially horizontal axis and defining the bottom of a second main chamber, and a third relatively small curved wall portion along a third substantially horizontal axis and defining the bottom of an auxiliary chamber, said auxiliary chamber being positioned between said first and second main chambers with said first, second, and third axes substantially parallel to each other, a first rotor having a plurality of elongated mixing paddles adjacent the outer periphery thereof, each of said elongated mixing paddles extending substantially between said side walls wherein said first rotor substantially assumes a paddle wheel shape, and means for rotating said first rotor in said first main chamber about said first axis to move said mixing paddles across said first wall portion toward said auxiliary chamber, said first rotor having a diameter wherein said mixing paddles travel in an arc substantially conforming to and adjacent said first wall portion, a second rotor having a plurality of elongated mixing paddles adjacent the outer periphery thereof, each of said elongated mixing paddles extending substantially between said side walls wherein said second rotor substantially assumes a paddle wheel shape, and means for rotating said second rotor in said second main chamber about said second axis to move said mixing paddles across said second wall portion toward said auxiliary chamber, said second rotor having a diameter wherein said mixing paddles travel in an arc substantially conforming to and adjacent said second wall portion, said first rotor having first and second rotor sections spaced from each other along said first axis, means for supporting said elongated mixing paddles between said first and second rotor sections at a slight acute angle to said first axis wherein the mixing paddles of the rotating first rotor will impart an axial component of movement to the feed along said first axis wherein each of said elongated mixing paddles of said first rotor respectively extends substantially straight along a substantially straight axis between said first and second rotor sections, and an auger and means for rotating said auger in said auxiliary chamber adjacent said third wall portion to move feed axially of said auger along said third axis.

3. A mixer primarily intended for use as a feed mixer for cattle and other livestock, said mixer including:

a mixing tank having forward and rearward walls, a bottom wall, and opposite side walls, said bottom wall having a first relatively large curved wall portion extending along a first substantially horizontal axis and defining the bottom of a first chamber, a second relatively large curved wall portion extending along a second substantially horizontal axis and defining the bottom of a second main chamber, and a third relatively small curved wall portion along a third substantially horizontal axis and defining the bottom of an auxiliary chamber, said auxiliary chamber being positioned between said first and second main chambers with said first, second, and third axes substantially parallel to each other, a first rotor having a plurality of elongated mixing paddles adjacent the outer periphery thereof, each of said elongated mixing paddles extending substantially between said side walls wherein said first rotor substantially assumes a paddle wheel shape, and means for rotating said first rotor in said first main chamber about said first axis to move said mixing paddles across said first wall portion toward said auxiliary chamber, said first rotor having a diameter wherein said mixing paddles travel in an arc substantially conforming to and adjacent said first wall portion, a second rotor having a plurality of elongated mixing paddles adjacent the periphery thereof, each of said elongated mixing paddles extending substantially between said side walls wherein said second rotor substantially assumes a paddle wheel shape, and means for rotating said second rotor in said second main chamber about said second axis to move said mixing paddles across said second wall portion toward said auxiliary chamber, said second rotor having a diameter wherein said mixing paddles travel in an arc substantially conforming to and adjacent said second wall portion, said first rotor having first and second rotor sections spaced from each other along said first axis and means for supporting said mixing paddles between said first and second rotor sections with said mixing paddles extending generally along the first axis and substantially uniformly spaced from each other abaout said first axis, said second rotor having first and second rotor sections spaced from each other along the second axis and means for supporting said mixing paddles between said first and second rotor sections with said mixing paddles extending along the second axis and substantially uniformly spaced from each other about said second axis in a manner corresponding to the spacing of the mixing paddles of the first rotor, said respective rotating means for said first and second rotors rotating the first and second rotors in a staggered fashion wherein the mixing paddles on the first and second rotors are out of phase with each other and alternately pass by a common location in said mixing tank substantially midway between the first and second axes of the first and second rotors so that alternately part of the feed in the first main chamber is transferred across to the second main chamber substantially at said common location as each mixing paddle of the first rotor passes by said common location and part of the feed in the second main chamber is transferred across to the first main chamber substantially at said common location as each mixing paddle of the second rotor passes by said common location, said first rotor has four mixing paddles substantially spaced 90 degrees apart about said first axis and said rotor has four mixing paddles spaced substantially 90 degrees apart about said second axis and the mixing paddles of the first and second rotors are substantially 45 degrees of out phase with each other, and an auger and means for rotating said auger in said auxiliary chamber adjacent said third wall portion to move feed axially of said auger along said third axis.

4. A mixer primarily intended for use as a feed mixer for cattle and other livestock, said mixer including:

a mixing tank having forward and rearward walls, a bottom wall, and opposite side walls, said bottom wall having a first relatively large curved wall portion extending along a first substantially horizontal axis and defining the bottom of a first chamber, a second relatively large curved wall portion extending along a second substantially horizontal axis and defining the bottom of a second main chamber, and a third relatively small curved wall portion along a third substantially horizontal axis and defining the bottom of an auxiliary chamber, said auxiliary chamber being positioned between said first and second main chambers with said first, second, and third axes substantially parallel to each other, a first rotor having a plurality of elongated mixing paddles adjacent the outer periphery thereof, each of said elongated mixing paddles extending substantially between said side walls wherein said first rotor substantially assumes a paddle wheel shape, and means for rotating said first rotor in said first main chamber about said first axis to move said mixing paddles across said first wall portion toward said auxiliary chamber, said first rotor having a diameter wherein said mixing paddles travel in an arc substantially conforming to and adjacent said first wall portion, a second rotor having a plurality of elongated mixing paddles adjacent the periphery thereof, each of said elongated mixing paddles extending substantially between said side walls wherein said second rotor substantially assumes a paddle wheel shape, and means for rotating said second rotor in said second main chamber about said second axis to move said mixing paddles across said second wall portion toward said auxiliary chamber, said second rotor having a diameter wherein said mixing paddles travel in an arc substantially conforming to and adjacent said second wall portion, said first rotor having first and second rotor sections spaced from each other along said first axis and means for supporting said mixing paddles between said first and second rotor sections with said mixing paddles extending generally along the first axis and substantially uniformly spaced from each other abaout said first axis, said second rotor having first and second rotor sections spaced from each other along the second axis and means for supporting said mixing paddles between said first and second rotor sections with said mixing paddles extending along the second axis and substantially uniformly spaced from each other about said second axis in a manner corresponding to the spacing of the mixing paddles of the first rotor, said respective rotating means for said first and second rotors rotating the first and second rotors in a staggered fashion wherein the mixing paddles on the first and second rotors are out of phase with each other and alternately pass by a common location in said mixing tank substantially midway between the first and second axes of the first and second rotors so that alternately part of the feed in the first main chamber is transferred across to the second main chamber substantially at said common location as each mixing paddle of the first rotor passes by said common location and part of the feed in the second main chamber is transferred across to the first main chamber substantially at said common location as each mixing paddle of the second rotor passes by said common location wherein the first and second rotors respectively have at least n number of mixing paddles spaced substantially 360/n degrees apart from each other about the respective first and second axes with the mixing paddles of the first and second rotors substantially 360/2n degrees of out phase with each other, and an auger and means for rotating said auger in said auxiliary chamber adjacent said third wall portion to move feed axially of said auger along said third axis.

5. A method of mixing material such as feed for cattle and other livestock, said method including the steps of:

(a) providing a mixing tank having forward and rearward end walls, a bottom wall, and opposite side walls, said bottom wall having a first relatively large curved wall portion extending along a first substantially horizontal axis and defining the bottom of a first main chamber, a second relatively large curved wall portion extending along a second substantially horizontal axis and defining the bottom of a second main chamber, and a third relatively small curved wall portion extending along a third substantially horizontal axis and defining the bottom of an auxiliary chamber, said auxiliary chamber being positioned between said first and second main chambers with said first, second, and third axes substantially parallel to each other, (b) loading material into said mixing tank, (c) moving at least one elongated mixing paddle in said first main chamber about said first axis across said first wall portion toward said auxiliary chamber in an arc substantially conforming to and adjacent said first wall portion with said elongated mixing paddle extending substantially between said side walls, (d) moving at least one elongated mixing paddle in said second main chamber about said second axis across said first wall portion toward said auxiliary chamber in an arc substantially conforming to and adjacent said second wall portion with said elongated paddle extending substantially between said side walls, and (e) moving material in said auxiliary chamber axially along said third axis.

6. The method of claim 5, wherein step (c) includes the further limitation of imparting an axial component of movement to the material along said first axis with said at least one mixing paddle.

7. The method of claim 6 wherein the axial component of movement imparted to the material is in a direction opposite to the axial movement of step (e).

8. The method of claim 6 wherein step (d) includes the further limitation of imparting an axial component of movement of the material along said second axis with said at least one mixing paddle.

9. The method of claim 8 wherein the axial components of movement of steps (c) and (d) are in the same direction along the respective first and second axes.

10. The method of claim 9 wherein the material movement of step (e) is in a direction along the third axis substantially opposite to the axial components of movement of steps (c) and (d).

11. The method of claim 5 further including the limitation of mounting said at least one mixing paddle of step (c) for pivotal movement about an axis.

12. The method of claim 5 further including the limitation of extending said at least one mixing paddle of step (c) substantially straight along a substantially straight axis.

13. The method of claim 5 wherein steps (c) and (d) include the further limitation of moving a plurality of elongated mixing paddles in each respective first and second main chamber about the respective first and second axes across the respective first and second wall portions toward the auxiliary chamber in respective arcs substantially conforming to and adjacent the respective first and second wall portions with the respective mixing paddles extending substantially between said side walls and said method further includes the step of alternately passing the mixing paddles of steps (c) and (d) by a common location in said mixing tank substantially midway between the first and second axes to alternately transfer part of the material in the first main chamber across to the second main chamber substantially at said common location as each mixing paddle of step (c) passes by the common location and transfer part of the material in the second main chamber across to the first main chamber substantially at said common location as each mixing paddle of step (d) passes by the common location.

14. The method of 13 wherein steps (c) and (d) each include the further limitation of imparting an axial component of movement to the material in the respective first and second main chambers with said respective mixing paddles.

15. The method of claim 14 wherein the imparted axial components are in the same direction along the respective first and second axes.

16. The method of claim 5 further including the steps of alternately transferring material across from said first main chamber to said second main chamber and from said second main chamber to said first main chamber.

17. The method of claim 16 wherein steps (c) and (d) each include the further limitation of imparting an axial component of movement to the material in the respective first and second main chambers in the same direction along the respective first and second axes wherein said material moves in the mixing tank from one side wall to the other is a substantially spiral 8 path.

18. The method of claim 5 further including the limitation of moving material between and along said first and second main chambers in a substantially spiral 8 path.

19. The method of claim 5 wherein said feed in said first main chamber has a top surface extending downwardly toward said forward wall and said method includes the further limitation of spilling said feed down said top surface toward said forward wall with a slight axial component of movement along said first axis.

20. A mixer primarily intended for use as a feed mixer for cattle and other livestock, said mixer including:
a mixing tank having forward and rearward end walls, a bottom wall, and opposite side walls, said bottom wall having a curved wall portion extending substantially along a first horizontal axis and defining the bottom of a chamber, and
a rotor having at least one elongated mixing paddle, first and second rotor sections spaced from each other along said first axis, means for pivotally mounting said elongated mixing paddle between said first and second rotor sections adjacent the outer peripheries thereof for pivotal movement relative to said first and second rotor sections about a second axis, said second axis being at a slight acute angle to said first axis, and means for rotating said rotor in said chamber about said first axis to move said mixing paddle across said wall portion, said rotor having a diameter wherein said mixing paddle travels in an arc substantially conforming to and adjacent said wall portion.

21. The mixer of claim 20 wherein said acute angle is about 15 degrees.

22. The mixer of claim 20 wherein said first rotor section includes at least one arm extending radially outwardly of said first axis and said second rotor section includes a corresponding arm extending radially outwardly of said first axis wherein said corresponding arm of said second section is offset about said first axis from the arm of the first rotor and said elongated mixing paddle extends between the arm of said first rotor section and the corresponding offset arm of the second rotor section to support said pivotally mounted, mixing paddle at said acute angle to said first axis.

23. The mixer of claim 22 wherein said offset and said acute angle are each about 15 degrees.

24. The mixer of claim 22 wherein said mixing tank has feed therein and said rotating means rotates said rotor to move said mixing paddle across said wall portion through said feed, said mixing paddle having a first, substantially planar face extending outwardly of said second axis wherein feed striking said first face as said mixing paddle moves through said feed produces a first torque on said first face tending to pivot said mixing paddle in a first direction about said second axis and said rotor further includes first stop means for holding said first face against said first torque in a first position with the plane thereof extending substantially radially of said first axis.

25. The mixer of claim 24 wherein said first stop means holds said first face of said mixing paddle in said first position with the plane thereof at said slight acute angle to said first axis wherein said first face imparts an axial component of movement to the feed along said first axis.

26. A mixer primarily intended for use as a feed mixer for cattle and other livestock, said mixer including:
a mixing tank having forward and rearward end walls, a bottom wall, and opposite side walls, said bottom wall having a curved wall portion extending substantially along a first horizontal axis and defining the bottom of a chamber, and
a rotor having at least one elongated mixing paddle, first and second rotor sections spaced from each other along said first axis, means for pivotally mounting said elongated mixing paddle between said first and second rotor sections adjacent the outer peripheries thereof for pivotal movement relative to said first and second rotor sections about a second axis, and means for rotating said rotor in said chamber about said first axis to move said mixing paddle across said wall portion, said rotor having a diameter wherein said mixing paddle travels in an arc substantially conforming to and adjacent said wall portion, said mixing tank having feed therein and said rotating means rotating said rotor to move said mixing paddle across said wall portion through said feed, and said mixing paddle having a first face extending outwardly of said second axis wherein feed striking said first face as said mixing paddle moves through said feed produces a first torque on said first face tending to pivot said mixing paddle in a first direction about said second axis, said first direction about said second axis being in the same rotational direction as said rotor moves about said first axis, and first stop means for holding said mixing paddle against said first torque in a first position with said first face extending outwardly of said second axis away from said wall portion, said mixing paddle having a second face extending outwardly of said second axis and means for biasing said first face toward said wall portion, said biasing means including said first face wherein said feed striking said first face as said mixing paddle moves through said feed biases said mixing paddle in said first position against said first stop means and biases said second face toward said wall portion, said second face pivoting about said second axis away from said wall portion in a direction opposite said first direction and against said first torque when said first face encounters an obstacle in said feed producing a torque on said first face greater than said first torque.

27. The mixer of claim 26 wherein said second face has an outer edge extending substantially parallel to said second axis and positioned immediately adjacent said wall portion when said first face is in said first position wherein said feed striking said first face as said mixing paddle moves through said feed biases said mixing paddle in said first position and biases said second face toward said wall portion with said outer edge thereof immediately adjacent said wall portion.

28. The mixer of claim 27 wherein said outer edge of said second face is positioned behind said second axis relative to the direction of movement of the mixing paddle across the wall portion wherein said outer edge trails behind the second axis as the mixing paddle moves across the wall portion.

29. The mixer of claim 28 wherein said second face includes a wiper member forming said outer edge and abutting said wall portion to wipe said wall portion when said first face is in said first position.

30. The mixer of claim 26 wherein said first and second face intersect each other to form an edge substantially parallel to said second axis and said mixer further includes means for positioning said edge ahead of said second pivot relative to the direction of movement of said mixing paddle through said feed when said first face is biased by said feed in said first position.

* * * * *